Aug. 27, 1957  E. F. KINGSBURY  2,804,574
ELECTRO-OPTICAL SYSTEM
Filed July 17, 1943

INVENTOR
E. F. KINGSBURY
BY
Stanley B. Kent
ATTORNEY

Patented Aug. 27, 1957

2,804,574
ELECTRO-OPTICAL SYSTEM

Edwin F. Kingsbury, Rutherford, N. J., assignor to Bell Telephone Laboratories, Incorporated, New York, N. Y., a corporation of New York Application July 17, 1943, Serial No. 495,120

16 Claims. (Cl. 315—157)

This invention relates to electro-optical systems and more particularly to electro-optical systems responsive to a wide range of light intensities.

An object of the invention is to provide an improved electro-optical system having a non-linear relationship between light intensity and electrical response.

A feature of the invention is a conductive variable resistance device connected in series with a light sensitive electric device to provide a utilizable voltage which varies approximately as the logarithm of the light intensity whereby approximately equal voltage changes may be obtained for equal percentage changes of light intensity within the operating light intensity range.

Another feature is an arrangement of the kind just described wherein such a variable resistance device is used that at very low light intensities the voltage changes are directly proportional to the changes in light intensity, while in the range of higher light intensities the voltage varies approximately as the logarithm of the light intensity.

In a system illustrative of the invention, a photoelectric cell, a battery and a variable resistance of the compressed and fired silicon carbide and clay type are connected in series, the voltage drop across the resistance being used to control a vacuum tube amplifier the input circuit of which includes a high fixed resistance. Such a variable resistance is, so far as can be determined, instantaneously responsive to current changes so that the resistance decreases as the current increases. Over a wide range of current values the resistance may be approximately equal inversely to the logarithm of the current, thus providing reasonable voltage changes for very large changes in light intensity. In an example of practice hereinafter to be described in more detail, light intensity changes of the order of 1000 produce voltage changes of the order of 24. In this system, utilizing an amplifier of limited range the operating range of light intensity can be increased and at the same time approximately equal response may be obtained for equal percentage changes of illumination within the light intensity range such as changes produced by cutting off the same fraction of steady illumination from the cell regardless of the intensity of the steady illumination within the range. Such a system is useful in light triggered projectiles and in counting devices controlled by natural illumination.

At very low light intensities producing small current values in the above-described example of practice, the resistance of the variable resistance device is substantially fixed and of high value resulting in higher sensitivity for these low light intensities where high sensitivity is most needed. Furthermore, by shunting the variable resistance with a fixed resistance of comparable or lower resistance value than the maximum value of the variable resistance, the shape of the response characteristic may be modified. This invention contemplates operating the variable resistance at current values where the resistance is substantially constant and also using the variable resistance shunted by a fixed resistance of suitably low value.

The type of variable resistance device suitable for this invention is often referred to as a "varistor." A varistor, as the term is used herein, may assume a variety of forms but it is always a conductive or semi-conductive device, never an electron emissive device. Varistors suitable for use in this invention, their composition and method of manufacture are described in McEachron Patent 1,822,-742, issued September 8, 1931.

In another arrangement illustrative of this invention, a fixed resistance is connected in series with a varistor, these two resistive elements constituting the sole resistive elements in the series circuit including the photoelectric cell. The voltage drop across both these resistance elements is utilized. The fixed resistance modifies the light versus voltage characteristic, particularly at the higher light values and may serve as a protective resistance at very high light intensities. In a modification of this arrangement the voltage drop across the varistor alone is impressed directly on the grid-cathode circuit of a trigger thyratron vacuum tube, the fixed resistance acting as the sole protective resistance when the thyratron is firing or in a conductive state.

The invention will now be described more in detail having reference to the accompanying drawings.

Figure 4:
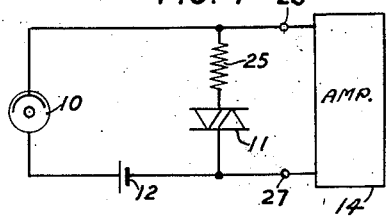
Figure 5:
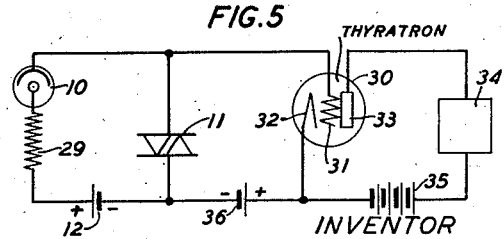

Fig. 4 is a schematic circuit diagram of a system in which a fixed resistance is connected in series with the varistor, the utilizable voltage being the voltage drop across both the resistance and the varistor; and Fig. 5 is a schematic circuit diagram of a system in which a trigger thyratron is directly connected to the terminals of a varistor which is connected in series with a protective fixed resistance.

The same reference characters are used to indicate identical elements in the drawing.

Figure 1:
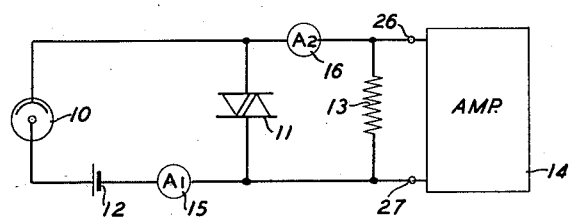
Fig. 1 is a schematic circuit diagram of one illustrative embodiment of the invention.

In Fig. 1 a photoelectric cell 10, a varistor 11, and a battery 12 are connected in series, the voltage drop across the varistor 11 being impressed on the voltage controlled vacuum tube amplifier 14 by coupling resistance 13. A microammeter 15 is connected in series with the photoelectric cell 10 to indicate the current flowing through the cell. A microammeter 16 is connected in series with resistance 13 to indicate the current flowing through the resistance 13.

The varistor 11 is of the fired silicon carbide and clay type disclosed in McEachron Patent 1,822,742, supra. The current, voltage and resistance characteristics of a particular varistor which functions satisfactorily in the circuit of Fig. 1 are shown graphically in Fig. 2. This varistor is in the form of a disc ¾ inch in diameter and approximately .04 inch thick having a central hole $\frac{9}{32}$ inch in diameter. The voltage versus current characteristic is shown by graph 17, the abscissas representing current through the varistor in amperes and the ordinates representing the voltage across the resistor in volts. The voltage versus resistance characteristic is shown by graph 18, the abscissas representing the resistance of the resistor in megohms and the ordinates representing voltage across the resistor in volts. The current versus resistance characteristic is shown by graph 19, the abscissas representing current through the varistor in amperes and the ordinates representing resistance in megohms. All of the scales for both the abscissas and ordinates are logarithmic.

Figure 2:
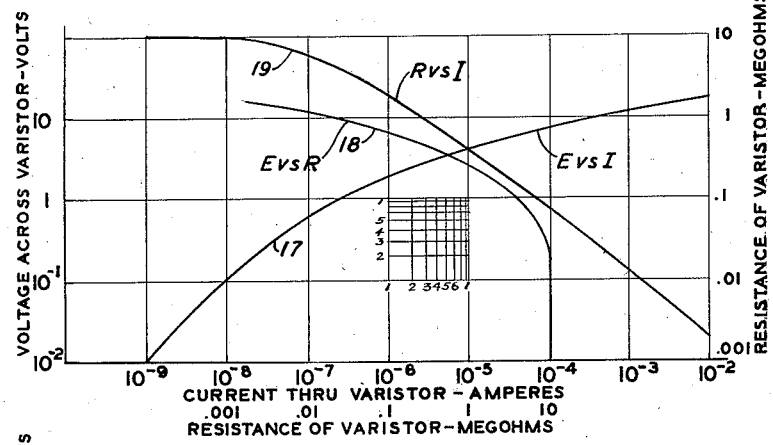
Fig. 2 shows graphs of the characteristics of the varistor of Fig. 1.

From Fig. 2 it is seen that for very small values of voltage and current, graphs 18 and 19, respectively, the resistance is constant and of a value of 10 megohms. Up to about $2.5 \times 10^{-8}$ amperes and up to about 0.2 volt the resistance remains constant. Above these values of current and voltage the resistance drops approximately logarithmically. The relationship is such, however, that the voltage while increasing with current, increases less rapidly at the higher values of current than at the lower values.

Figure 3:
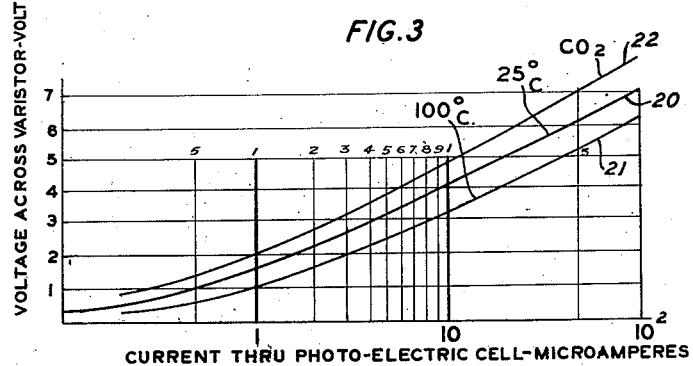
Fig. 3 is a graph showing the electrical response to light of the system of Fig. 1.

The advantages of using the varistor 11 shown in the arrangement of Fig. 1 and having the characteristics shown in Fig. 2 are illustrated in Fig. 3. Graph 20 shows the relationship at about comfortable room temperature between current through the photoelectric cell 10 and voltage across the resistor 11, the abscissas representing current in microamperes on a logarithmic scale and the ordinates representing voltage across the varistor in volts on a linear scale. The data for this graph 20 were obtained by illuminating the photoelectric cell 10 of Fig. 1 at several different light intensities and observing the current in microammeters 15 and 16, the input circuit of amplifier 14 having been disconnected at terminals 26 and 27. Knowing the resistance of resistance 13 which in this instance was 5 megohms, the voltage drop across varistor 11 could be computed. The voltage of battery 12 was 90 volts so that the voltage across the photoelectric cell 10 and the cell sensitivity was not materially reduced even at the maximum current shown. The current through the cell therefore was practically directly proportional to the illumination of the cell.

From graph 20 of Fig. 3 it is seen that if the current, that is, the illumination on the photoelectric cell, is reduced a given percentage starting from any value of current within the operable range of current, the reduction in voltage drop across the varistor 11 is approximately constant. This follows from the fact that graph 20 is approximately a straight line. Thus, a reduction in current of 50 percent from 100 microamperes to 50 microamperes produces a reduction in voltage drop from 7.1 to 6.2 volts or 0.9 volt; a reduction of 50 percent from 10 microamperes to 5 microamperes produces a reduction in voltage drop from 4.1 to 3.2 volts or 0.9 volt; and a reduction of 50 percent from 1 microampere to .5 microampere produces a reduction in voltage drop from 1.65 to 1 or .65 volt which is not much reduced from 0.9 volt at the higher current values. This is accomplished without materially sacrificing any sensitivity of the photoelectric cell.

At one microampere the resistance of varistor 11 is comparable to the resistance 13 as used to obtain the data for the graph 20 of Fig. 3. At current values less than one microampere the resistance of varistor 11 is higher than the resistance 13 and an appreciable proportion of current through the photoelectric cell flows through the resistance 13. The left-hand end of graph 20 is, therefore, lower than it would have been if all of the current had passed through varistor 11. It thus follows that the shape of the photoelectric current versus voltage characteristic may be changed by connecting in shunt of the varistor a fixed resistance of a value less than the resistance of the varistor at low current values. In the particular arrangement from which the data of graph 20 of Fig. 3 were obtained a more nearly constant voltage change was obtained for the same percentage change of current of light throughout the operable range of the system. This is an advantage where the change of voltage is of chief importance.

In addition to graph 20 two other graphs 21 and 22 are included in Fig. 3. Graph 21 shows the relationship between current through the photoelectric cell 10 and voltage across the varistor 11 when the varistor is at a high temperature of 100° C. Graph 22 shows the relationship between current through the photoelectric cell 10 and voltage across the varistor 11 when the varistor is at the low temperature of carbon dioxide snow. These extreme temperatures are probably greater than would be experienced in any reasonable use. Even at these extreme temperatures the advantage of approximately uniform changes of voltage for the same percentage changes of current or light is obtained. The differences in graphs 20, 21 and 22 are due to the fact that the type of varistor used has a negative temperature coefficient of resistance.

A modified arrangement is illustrated in Fig. 4. In this arrangement a fixed resistance 25 is connected in series with the varistor 11, the voltage drop across both the varistor 11 and resistor 25 being utilized at the terminals 26 and 27. At very low values of current through the photoelectric cell the sensitivity of this circuit is increased over that of Fig. 1 by making the impedance external to the photoelectric cell more nearly equal to the internal impedance of the cell which internal impedance is high when the illumination is small. At very high values of illumination where the current through the cell would be very large were it not for the resistance 25 due to the very low resistance of the varistor 11, the resistance 25 functions as a protective resistance. At intermediate values of illumination and current the circuit functions very much as the circuit of Fig. 1 with a high value of resistance 13 the characteristics being modified somewhat due to the presence of resistance 25. In this arrangement a single fixed resistance in series with the varistor 11 provides an improvement of the current versus voltage characteristic at low current values and protection of the photoelectric cell at very high illuminations while providing the advantages of a varistor alone at intermediate current values.

Another modified arrangement is illustrated in Fig. 5. In this arrangement the varistor 11 serves as a coupling impedance in the grid-cathode circuit of a thyratron 30. A protective resistance 29 is connected in series with the photoelectric cell 10, varistor 11 and battery 12. The grid 31 of the thyratron 30 is connected to the cathode of the photoelectric cell 10 and one terminal of the varistor 11. The cathode 32 of the thyratron 30 is connected through a biasing battery 36 to the other terminal of varistor 11 and the negative terminal of the battery 12. The external output circuit of the thyratron 30 includes a load impedance 34 and a battery 35 connected between the anode 33 and the cathode 32. Until the thyratron 30 fires, this arrangement has most of the advantages of an arrangement with an unshunted varistor or a varistor shunted by a very high resistance. However, when the thyratron 30 fires the ionized gas between the grid 31 and cathode 32 practically short-circuits the varistor 11 and the resistance 29 functions as a protective resistance for the photoelectric cell 10.

From the foregoing description it is seen that this invention comprising a light sensitive electric device and a varistor provides a simple circuit for the electrical control of devices such as vacuum tube amplifiers and thyratrons by means of light.

What is claimed is:

1. The combination with a source of potential of a light sensitive means and a conductive element in series with said source and with each other, said element having an approximately logarithmic current-voltage characteristic for at least a certain range of current values, and means connected electrically to said conducting element for utilizing the changes in the voltage across said element resulting from changes in the current therethrough from one value to another within different portions of said current range.

2. The combination with a space current repeating device having a cathode, an anode and a control element, a photoelectron emitting light sensitive means in the input circuit of said repeating device between said cathode and control electrode, a conductive element connected across said input circuit between said light sensitive means and said repeating device, said element having an approximately logarithmic voltage-current characteristic for at least a certain range of current values, a source of potential for supplying current to said light sensitive means and said conductive element in series, and means for utilizing current changes in the output current of said repeating device produced by changes in the voltage across said conductive element when the current therethrough changes from one value to another within different portions of said range of current values.

3. An electro-optical system comprising a series circuit including a photoelectric cell, a source of electric current and a varistor of the silicon carbide type, and means connected electrically to said series circuit to utilize the voltage drop in a portion of said series circuit.

4. An electro-optical system comprising a series circuit including a photoelectric cell, a source of electric current and a varistor of the silicon carbide type, and means connected electrically to the terminals of said varistor to utilize the voltage drop across said varistor.

5. An electro-optical system comprising a series circuit including a photoelectric cell, a source of electric current and a varistor of the silicon carbide type, and an amplifier having its input circuit connected across said varistor.

6. An electro-optical system comprising a photoelectric cell, a varistor and a source of voltage connected in a series circuit.

7. An electro-optical system comprising a photoelectric cell, a varistor and a source of substantially constant voltage connected in series and a substantially constant resistance connected in current modifying relationship to said varistor.

8. An electro-optical system comprising a photoelectric cell, a varistor and a source of substantially constant voltage connected in series and a substantially constant resistance of a value less than the maximum resistance of said varistor connected in current modifying relationship to said varistor.

9. An electro-optical system comprising a photoelectric cell, a varistor and a source of substantially constant voltage connected in series and a substantially constant resistance of a value less than the maximum resistance of said varistor connected in shunt to said varistor.

10. An electro-optical system comprising a photoelectric cell, a varistor and a source of substantially constant voltage connected in series and a substantially constant resistance of a value less than the maximum resistance of said varistor connected in shunt to said varistor, and means to utilize the voltage drop in a portion of said series circuit.

11. An electro-optical system comprising a photo-electric cell, a varistor and a source of substantially constant voltage connected in series and a substantially constant resistance of a value less than the maximum resistance of said varistor connected in shunt to said varistor, and a vacuum tube amplifier having an input circuit connected to shunt to both said varistor and constant resistance.

12. An electro-optical system comprising a photo-electric cell, a varistor, a substantially constant resistance, and a source of voltage connected in series, said varistor and resistance being the sole resistive elements in said series circuit, and means to utilize the voltage drop across both said varistor and resistance.

13. An electro-optical system comprising a photo-electric cell, a varistor, a source of voltage and a protective resistance all connected in series, a trigger thyratron having a cathode and grid and individual conductive connections from said cathode and grid to the respective terminals of said varistor whereby the cell is protected against excessive current while the thyratron is in the firing condition.

14. In combination with a vacuum tube amplifier having an input circuit, a photoelectron emitting light sensitive means connected in series with said input circuit, a conductive element connected across said input circuit between said light sensitive means and said amplifier, said element having an approximately logarithmic voltage-current characteristic for at least a certain range of current values, and a source of potential for supplying current to said light sensitive means and said conductive element in series, said amplifier including means for utilizing current changes in the amplified current of said amplifier produced by changes in the voltage across said conductive element when the current therethrough changes from one value to another within different portions of said range of current values.

15. An electro-optical system comprising a light sensitive electric device and a varistor connected in a series circuit.

16. An electro-optical system comprising a light sensitive electric device and a varistor connected in series and a substantially constant resistance connected in shunt of said varistor, said resistance having a value less than the maximum resistance of said varistor and greater than the resistance of said varistor at values of illumination of said light sensitive device greater than some desired relatively low value of illumination.

References Cited in the file of this patent

UNITED STATES PATENTS

| | | |
|---|---|---|
| 1,313,187 | Hull | Aug. 12, 1919 |
| 1,650,092 | Poulsen et al. | Nov. 22, 1927 |
| 1,680,348 | Thilo | Aug. 14, 1928 |
| 1,832,707 | Hull | Nov. 17, 1931 |
| 1,864,670 | Reynolds | June 28, 1932 |
| 1,889,758 | Nakken | Dec. 6, 1932 |
| 2,145,021 | Berges | Jan. 24, 1939 |
| 2,219,189 | Lundstrom | Oct. 22, 1940 |
| 2,360,233 | Hussey | Oct. 10, 1944 |

FOREIGN PATENTS

| | | |
|---|---|---|
| 474,421 | Great Britain | Oct. 28, 1937 |

OTHER REFERENCES

Article by John Russell, vol. 8, pp. 495–6, Rev. of Scien. Inst. for December 1937.

Thermistors in Electronic Circuits, Electronic Industries, January 1945, pages 76–80.